(12) United States Patent
Wang et al.

(10) Patent No.: US 10,372,871 B2
(45) Date of Patent: Aug. 6, 2019

(54) IC LAYOUT POST-DECOMPOSITION MASK ALLOCATION OPTIMIZATION

(71) Applicant: GLOBALFOUNDRIES INC., Grand Cayman (KY)

(72) Inventors: Lynn Tao-Ning Wang, Fremont, CA (US); Sriram Madhavan, Santa Clara, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 104 days.

(21) Appl. No.: 15/662,419

(22) Filed: Jul. 28, 2017

(65) Prior Publication Data

US 2019/0034577 A1    Jan. 31, 2019

(51) Int. Cl.
    *G06F 17/50*    (2006.01)
(52) U.S. Cl.
    CPC ...... *G06F 17/5081* (2013.01); *G06F 2217/12* (2013.01)
(58) Field of Classification Search
    USPC ..................................................... 716/50–56
    See application file for complete search history.

(56) References Cited

U.S. PATENT DOCUMENTS

| | | | |
|---|---|---|---|
| 7,650,587 B2 | 1/2010 | Baum et al. | |
| 8,037,428 B2 | 10/2011 | Tong et al. | |
| 8,151,219 B2 | 4/2012 | Huckabay et al. | |
| 8,473,874 B1* | 6/2013 | Sharma | G06F 17/5081 700/120 |
| 8,555,215 B2 | 10/2013 | Zou et al. | |
| 8,631,379 B2 | 1/2014 | Chen et al. | |
| 8,647,893 B1 | 2/2014 | Agarwal et al. | |
| 8,869,075 B2 | 10/2014 | Sun et al. | |
| 2011/0078638 A1* | 3/2011 | Kahng | G06F 17/50 716/52 |
| 2013/0061183 A1 | 3/2013 | Abou Ghaida et al. | |
| 2014/0317580 A1* | 10/2014 | Ye | G03F 1/144 716/53 |

\* cited by examiner

*Primary Examiner* — Binh C Tat
(74) *Attorney, Agent, or Firm* — Gibb & Riley, LLC; David A. Cain, Esq.

(57) ABSTRACT

An IC design layout is decomposed into multiple masks to produce an initial output. A post-decomposition optimization is performed. The post-decomposition optimization includes identifying hotspots in the multiple masks, clustering features that contribute to the hotspots into clusters, identifying ones of the clusters that can be relocated to a different mask to eliminate the hotspot, without violating design rules, as reversible clusters, ranking movement of the reversible clusters by comparing the reversible clusters, as potentially moved, to known manufacturability metrics, and moving the reversible clusters to different masks according to the priority established by the ranking, to produce a post-decomposition optimized tape-out. The IC devices are manufactured by applying the post-decomposition optimized tape-out to manufacturing equipment.

20 Claims, 10 Drawing Sheets

IC LAYOUT POST-DECOMPOSITION MASK ALLOCATION OPTIMIZATION

BACKGROUND

Field of the Invention

The present disclosure relates to integrated circuit (IC) designs and manufacturing, and more specifically to mask allocation optimization that occurs on an IC layout after decomposition.

Description of Related Art

Integrated circuit manufacturers often use a concept known as Design-For-Manufacturability (DFM), which helps keep processes consistent with features of a given manufacturing facility or foundry, to improve manufacturability. DFM defines rules specific to the foundry to help guide designers, and captures process-related sensitivity information (in an abstract or model format) that is specific to the foundry. This centers the efforts of designers to create designs that are feasible to a given foundry based on timing, area requirements, power requirements, specific design techniques used, etc.

Many yield and reliability issues that are tracked by DFM can be attributed to certain layout configurations, referred to as "process hotspots" or "hotspots," which are susceptible to process issues such as stress and lithographic process fluctuations. It is, therefore, desirable to identify and remove these process hotspot configurations and replace them with more yield-friendly configurations.

Hotspots can be reduced by moving some shapes to alternate masks. More specifically, the process of preparing an IC design for manufacturing involves creating a layout, which shows where conductors, insulators, semiconductors, doped regions, etc., are to be located in the different layers of a multi-layer IC device. Once a layout is created, it can be decomposed into many different masks. In decomposition, IC features are separated into individual masks, such that when combined during lithography, they produce the desired features of a specific layer of the IC design.

Automated decomposition tools are capable of splitting a layout of the IC design into separate optical masks for the multiple exposures that will occur, or into separate mask phases for masks that include multiple phases. A single mask can be used to expose different mask phases using techniques (etching or other pattern of the optical mask, etc.) that create topographical changes in the underside of the mask. Therefore, for example, a single patterning layer of an IC design can be decomposed into two or more different patterns of shapes of conductors, insulators, semiconductors, etc., that are printed on two or more separate masks (or mask phases). The assignment of particular shapes to the different decomposed masks (or mask phases) of a given layer is commonly referred to as "coloring," even though there is no actual color difference between the masks. The term coloring is used because the different masks or mask phases are shown using different colors on the display or representation. Each of the masks is then exposed on the wafer and their resulting images recombine to form the original desired pattern.

Another feature used in mask creation is optical proximity correction or optical proximity compensation (OPC), which is a technology used to compensate for different types of distortions. OPC software automatically changes the mask layout by moving segments of line edges and adding extra features that compensate the layout for distortions projected to occur during manufacturing.

SUMMARY

Various methods herein begin with a manually or automatically created integrated circuit (IC) design layout that is received into an automated decomposition application operating on a computerized system. The methods use the automated decomposition application to automatically perform a decomposition of each layer in the multi-layer IC design layout into multiple masks, to produce an initial output. Additionally, with these methods, an automated optical proximity correction (OPC) application, again operating on the computer system, is used to automatically perform an optical proximity correction process on the multiple masks in the initial output, which generally enlarges some of the shapes in the masks.

Before OPC, an automated post-decomposition optimization application, also operating on the computer system, is used to automatically perform a post-decomposition optimization to revise the initial output, and thereby produce a post-decomposition optimized tape-out. The post-decomposition optimization involves a number of processes. One of these processes is identifying violation areas in the multiple masks that match known weak shapes, or that violate spacing rules, and therefore lack sufficient spacing for defect-free manufacturing. The known weak shapes have an elevated risk of defects. These processes identify what is referred to as "hotspots" in the multiple masks. More specifically, such hotspots occur where the spacing between adjacent features within one of the masks is below a previously established minimum spacing measure at which defect-free manufacturing can reliably be performed.

Another process performed during the post-decomposition optimization is clustering the IC design layout features that contribute to the hotspots into clusters. More specifically, the clustering combines connected and/or adjacent features (a chain of polygons) that lack spacing for defect-free manufacturing.

The post-decomposition optimization also identifies which of the clusters can be relocated to a different mask to eliminate the hotspot, without violating design rules, and these clusters are referred to as "reversible" features. Some decomposition applications produce two complementary masks for a given layer or level of the IC design, while other decomposition applications produce more than two masks per level. If only two complementary masks are produced, clusters in one mask are checked for compliance with the design rules to see if they can be moved to the other complementary mask. With more than two masks, the clusters can be checked for compliance with the design rules with possible movement to all the other possible masks.

An additional process performed during the post-decomposition optimization is ranking the possible movement of the reversible clusters to different masks by comparing the reversible clusters, as potentially moved, to known manufacturability metrics. This ranking process is based on, for example, which reversible clusters have fewer features, which reversible clusters provide more area balancing between the masks, and/or which reversible clusters provide more improvement in spacing between the features in the masks, etc.

Thus, many metrics can be used to rank the reversible clusters, such as the number of polygons in the chains of the clusters (where less polygons in a chain would rank higher relative to more in the chain; because a fewer number of polygons that have their color changed reduces the likelihood of disturbing the original design intent). Further, the clusters can be ranked based on balancing the density of polygons within each mask; where, for example, cluster color reversals that tended to make opposing masks more balanced are ranked higher than cluster color reversals that tended to make opposing masks more unbalanced (with a highest ranking cluster color reversal being one that moves polygons to cause 50% of the polygons to be in one mask or mask phase, and 50% of the polygons to be in the other mask or mask phase (in a two mask system)). Post-move spacing can also be used to rank various potential cluster reversals, where cluster reversals that produce greater spacing between shapes on a given mask will be ranked higher relative to cluster reversals that produce less spacing between shapes.

Then, the post-decomposition optimization moves the reversible clusters to different masks according to the priority established by the ranking to produce the post-decomposition optimized tape-out. The decomposition of the IC design layout is not repeated after, or during, the post-decomposition optimization. Later, these methods manufacture the IC devices by applying the post-decomposition optimized tape-out to manufacturing equipment, which is automatically controlled by the computerized system. The spacing rules, design rules, and manufacturability metrics are specific to a given foundry in which the IC devices are manufactured. Additionally, the multiple masks relate to the same area of the IC device that is manufactured, and are used at different points in a manufacturing process.

Various systems herein include an automated decomposition application operating on a computerized device that is capable of receiving an integrated circuit (IC) design layout. The automated decomposition application is capable of performing a decomposition of the IC design layout into multiple masks to produce an initial output. The systems herein can also include an automated optical proximity correction (OPC) application operating on the computerized device that is capable of performing an optical proximity correction process on the multiple masks in the initial output after the automated post-decomposition optimization application performs the post-decomposition optimization.

Such systems also include an automated post-decomposition optimization application operating on the computerized device that is capable of performing a post-decomposition optimization. The post-decomposition optimization identifies violation areas in the multiple masks that lack spacing for defect-free manufacturing, and matches shapes in the multiple masks to known weak shapes, to identify hotspots in the multiple masks. The post-decomposition optimization also clusters features that contribute to the hotspots into clusters, identifies ones of the clusters that can be relocated to a different mask to eliminate the hotspot, without violating design rules, as reversible clusters. Further, the post-decomposition optimization ranks movement of the reversible clusters by comparing the reversible clusters, as potentially moved, to known manufacturability metrics, and moves the reversible clusters to different masks according to the priority established by the ranking, to produce a post-decomposition optimized tape-out.

These systems also include a connection to manufacturing equipment that is automatically controlled to be capable of manufacturing IC devices by applying the post-decomposition optimized tape-out to the manufacturing equipment.

BRIEF DESCRIPTION OF THE DRAWINGS

The embodiments herein will be better understood from the following detailed description with reference to the drawings, which are not necessarily drawn to scale and in which:

FIGS. 2A-10B are schematic diagrams illustrating optical masks produced from the IC layout shown in FIG. 1;

DETAILED DESCRIPTION

As mentioned above, decomposition is a widely used technique in IC manufacturing; however, decomposition-induced yield issues are often not detected until the data is in the format to be supplied to automated manufacturing equipment (e.g., tape out (T/O)); which can require the decomposition process to be rerun. Further, automated decomposition solutions are run-time intensive, causing a T/O delay in the order of weeks.

In view of the foregoing, the methods and systems herein provide fast-performing DFM computer aided design (CAD) processing that corrects coloring-induced yield issues, and optimize the coloring of decomposed layout, without re-running decomposition. More specifically, such methods and systems perform pattern matching and clustering to apply fixes and optimizations directly on the decomposed design, reducing T/O cycle time from weeks to hours. In addition, these methods and systems use a prioritization method that ranks localized coloring changes based on pre-characterized DFM metrics.

The post-decomposition, pattern matching and clustering processing herein automates localized fixing to improve yield and T/O cycle time, by addressing known yield issues and avoiding re-running decomposition. Thus, patterns and DFM metrics are used to minimize changes to the original decomposed design, preserving designers' intent. These local coloring optimizations ensure accurate implementation of DFM patterns and rules.

Figure 1:
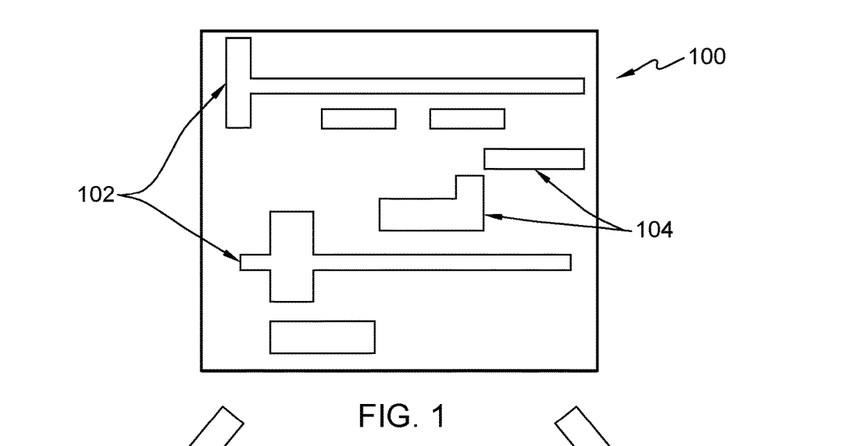
FIG. 1 is a schematic diagram illustrating an IC layout.

FIG. 1 illustrates a portion of an IC layout 100 prepared either automatically (according to a designer's instructions) or manually, using design applications. The IC layout 100 includes various features 102, 104 having shapes; and these features 102, 104 can be insulators, conductors, semiconductors, doped regions, etc.

Figures 2A, 2B:
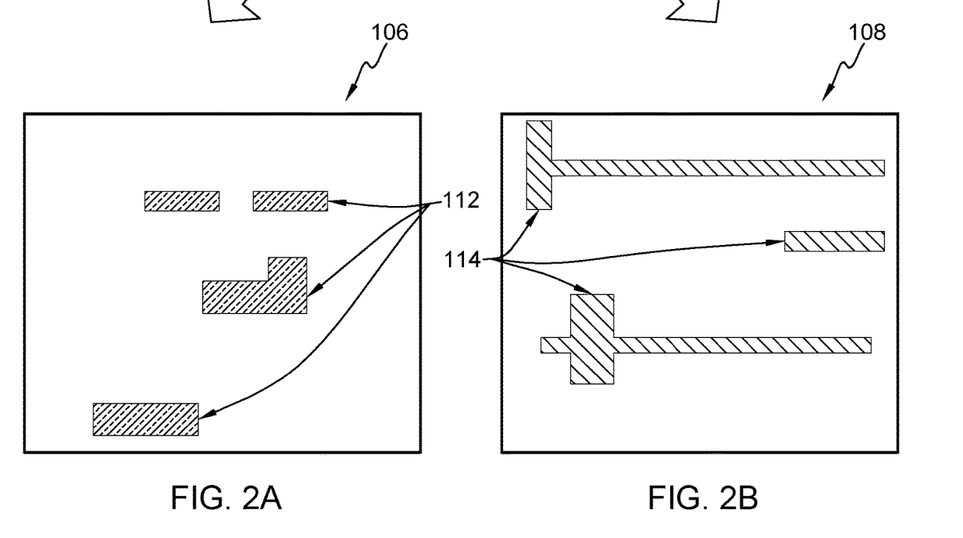

FIGS. 2A-2B illustrates different masks 106, 108 that a decomposition application (which is operating on a computerized system) produces. The automated decomposition application automatically performs a decomposition of each layer in the multi-layer IC design layout into multiple masks 106, 108, having mask features 112, 114 (corresponding to the IC layout features 102, 104) to produce an initial output.

Figure 3:
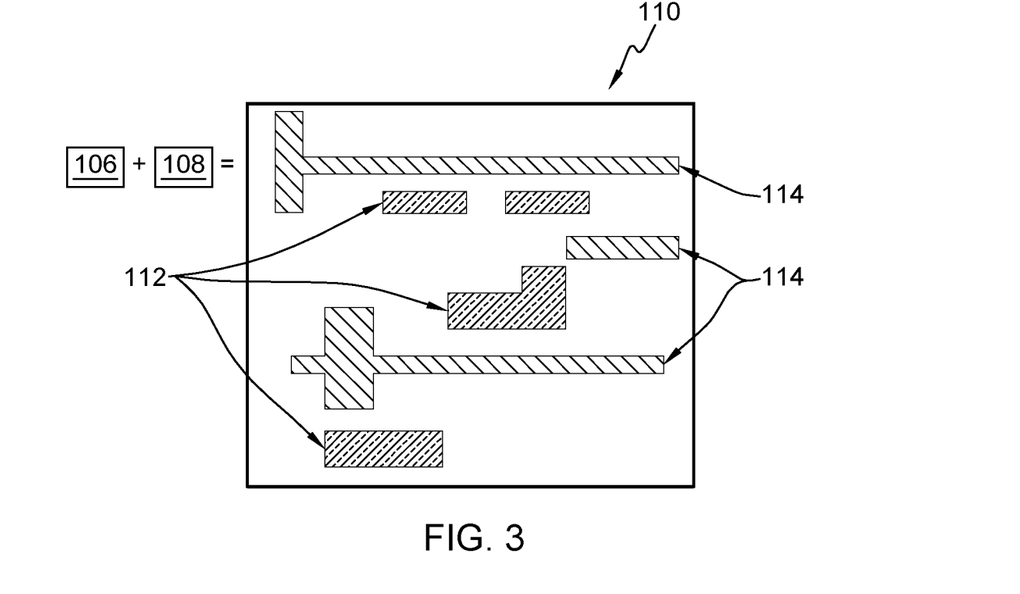

Additionally, with these methods an automated optical proximity correction (OPC) application, again operating on the computer system, automatically performs an optical proximity correction process on the multiple masks in the initial output, which generally enlarges some of the shapes in the masks, and masks 106, 108 combined together in a single representation or display 110 are shown after OPC in FIG. 3. Many times the features 112, 114 of the different masks 106, 108 are shown using different colors or cross-hatch patterns in the display 110, as shown in FIG. 3. The different colors can represent masks with different light phases, and in one example, masks 106 and 108 can be considered complementary, when they are completely out of phase with one another (e.g., 180° out of phase). The different colors can represent different mask layers, also.

Before the OPC, an automated post-decomposition optimization application, also operating on the computer system, automatically performs a post-decomposition optimization process to revise the initial output, and thereby produce a post-decomposition optimized tape-out. The post-decomposition optimization involves a number of processes.

Figure 4:
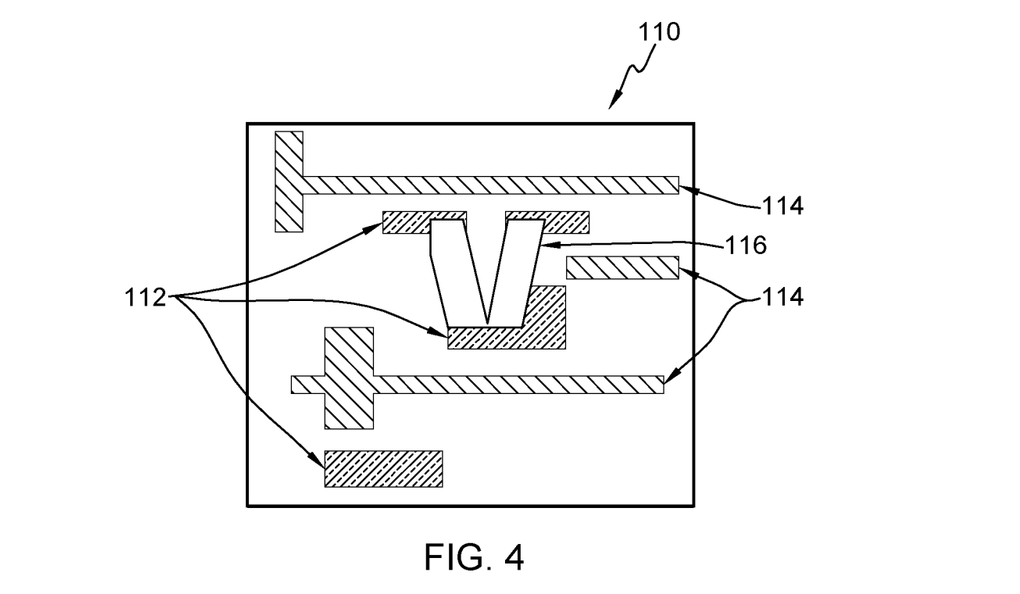
Figure 5:
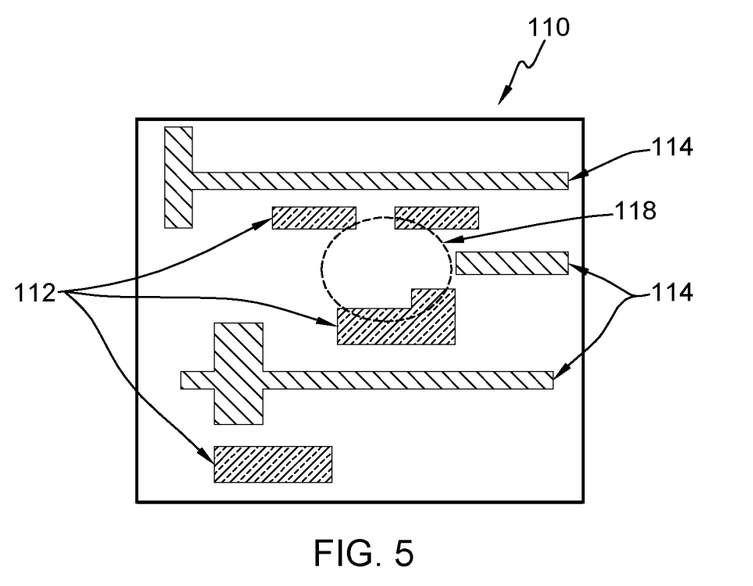

One of these process matches shapes in the multiple masks to known weak shapes that have an elevated risk of defects. One such shape is shape 116, which overlaps some of the shapes, as shown in FIG. 4. Additionally or alternatively, this processing identifies violation areas (e.g., between polygon shapes) in the multiple masks that violate spacing rules, and therefore lack sufficient spacing for defect-free manufacturing are identified. One such spacing violation is shown in FIG. 5 as item 118. These processes therefore identify what is referred to as "hotspots" 116, 118 in the multiple masks 106, 108, as shown in FIGS. 4 and 5. More specifically, such hotspots 116, 118 occur where the spacing between adjacent features within one of the masks is below a previously established minimum spacing measure at which defect-free manufacturing can reliably be performed.

Figure 6:
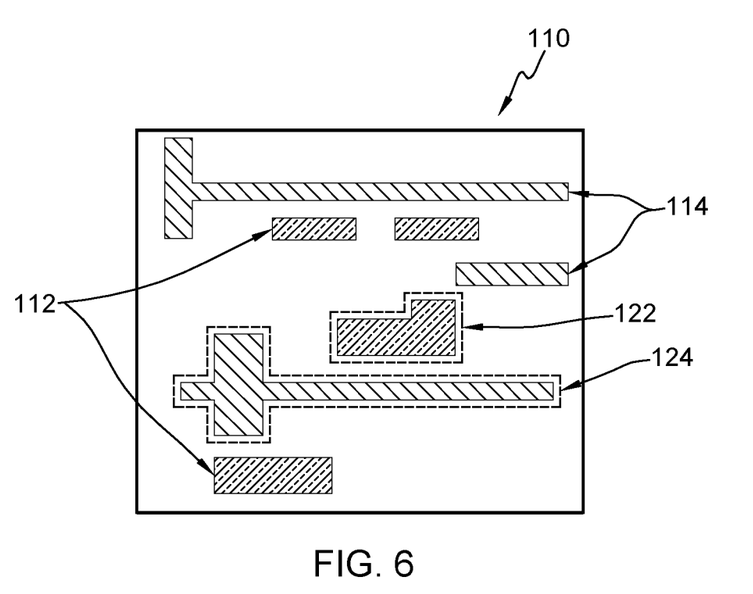

Another process performed during the post-decomposition optimization is clustering the IC design layout features that contribute to the hotspots 116, 118; such as polygons 122 and 124, as shown in FIG. 6. More specifically, the clustering combines connected and adjacent features (chains of polygons) that lack spacing for defect-free manufacturing. Thus, each of the polygons 122, 124 forms a cluster, a chain of connected polygon shapes within a single mask or multiple masks (or mask phases). However, the clustering process excludes the adjacent features 112, and 114 from the cluster such that when reversible clusters (described below) are moved to a different mask, the chain of polygons is moved to a separate mask or mask phase.

The post-decomposition optimization also identifies which of the clusters can be relocated to a different mask to eliminate the hotspot, without violating design rules, and these clusters are referred to as "reversible" features. Again, this involves checking whether a moved cluster would create a spacing issue in the other mask or mask phase. In FIG. 6, the post-decomposition optimization herein determines that clusters 122, and 124 can be moved from mask 108 to mask 106 (and vice versa) without violating design rules, and therefore, the clusters are considered reversible features.

An additional process performed during the post-decomposition optimization is ranking the possible movement of the reversible clusters to different masks by comparing the reversible clusters, as potentially moved, to known manufacturability metrics. This ranking process is based on, for example, which reversible clusters have fewer features, which reversible clusters provide more area balancing between the masks, and/or which reversible clusters provide more improvement in spacing between the features in the masks, etc.

Figure 7:
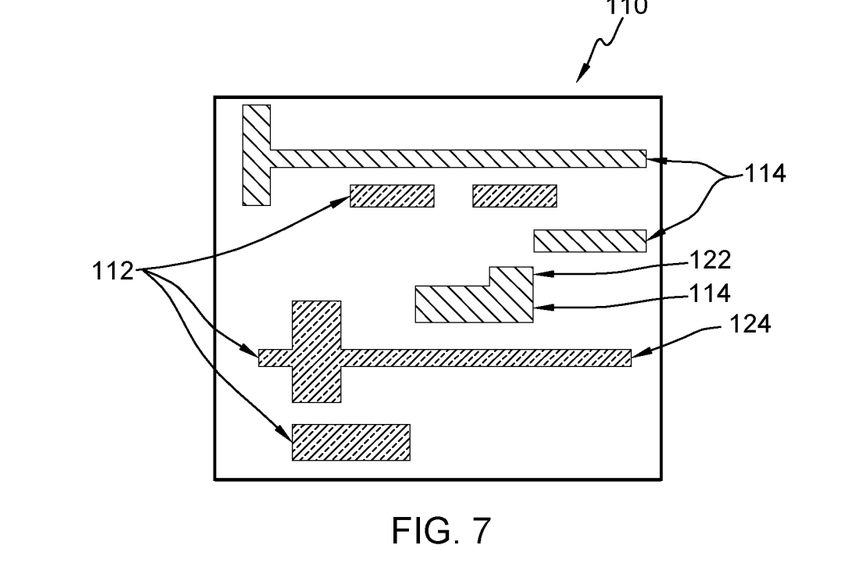

Therefore, for example, such a ranking can dictate that cluster 122 be moved from mask 108 to mask 106, allowing cluster 122 to be identified in the representation 110 using the color or cross-hatching of features of mask 106 (e.g., items 112 in FIG. 7); and similarly allowing cluster 124 to be identified in the representation 110 using the color or cross-hatching of features of mask 108 (e.g., items 114 in FIG. 7). Thus, FIG. 7 illustrates the representation 110 with the revised masks (e.g., after one or more reversible features are reversed). In this way, the methods and systems herein eliminate the hotspot 116 by changing the "color" of cluster that includes clusters 122, 124 from the color of mask 108 to the color of mask 106, and vice versa (where color indicates on which mask, or mask phase, the shape will appear). Then, the post-decomposition optimization moves the reversible clusters to different masks according to the priority established by the ranking to produce the post-decomposition optimized tape-out.

Some decomposition applications produce two complementary masks for a given layer or level of the IC design (as shown in FIGS. 2A-2B), while other decomposition applications produce more masks per level. If only two complementary masks are produced, clusters in one mask are checked for compliance with the design rules to see if they can be moved to the other complementary mask or mask phase. With more than two masks, the clusters can be checked for compliance with the design rules with possible movement to all the other masks.

Figure 8A:
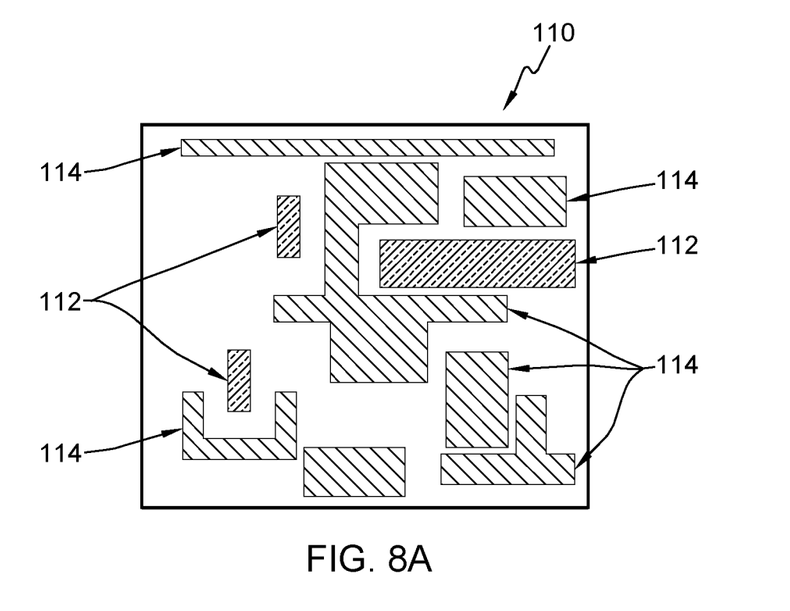

As noted above, one process performed during the post-decomposition optimization is ranking the possible movement of the reversible clusters to different masks by comparing the reversible clusters, as potentially moved, to known manufacturability metrics, and this is illustrated in greater detail in FIGS. 8A-10B. Many metrics can be used to rank the reversible clusters, such as the number of polygons in the chains of the clusters, as shown in FIGS. 8A-8B. In this type of reversible cluster ranking, a chain with fewer polygons is ranked higher than chains with more polygon shapes. This type of ranking can be used to stay as close to the original designer's intent as possible, or to keep as close to the desired DFM metrics as possible, because the fewer number of polygons that have their color (mask) changed reduces the likelihood of disturbing the original design intent (as less items are changed, this keeps the product closer to the original).

Figure 8B:
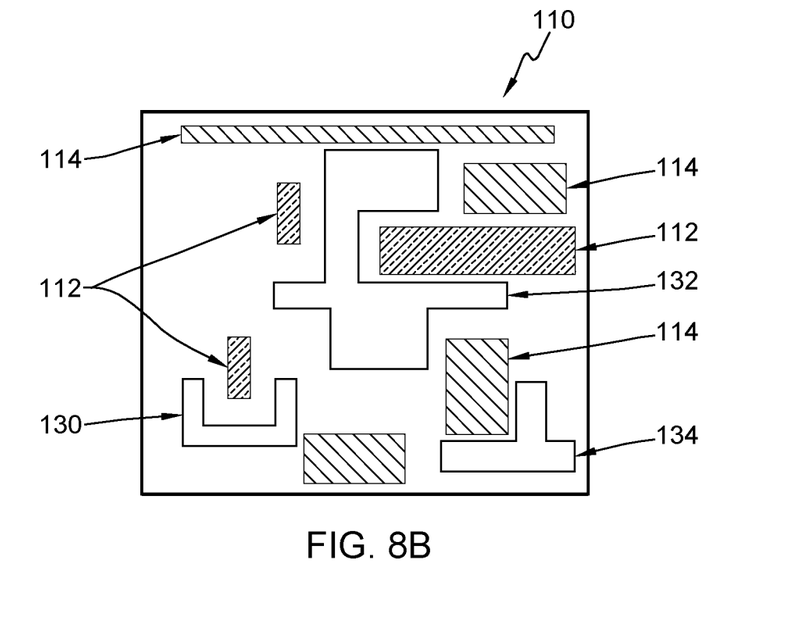

More specifically, FIG. 8A illustrates features of two masks 112, 114, combined on the representation 110, where the polygons are all shown as rectangles. FIG. 8B shows that the processing herein identifies three different reversible clusters of such rectangles 130, 132, and 134, which can all be reversed from mask feature 114 to mask feature 112. As shown in FIG. 8B, reversible cluster 130 is formed from three rectangles, reversible cluster 132 is formed from four rectangles, and reversible cluster 134 is formed from two rectangles; which causes processing herein to rank reversible cluster 134 first, reversible cluster 130 second, and reversible cluster 132 last, using the least number of polygons as the ranking metric. Depending upon other possible metrics or preferences, some processing may only change the mask of one cluster (which would reverse only reversible cluster 134); other processing may change the mask of two clusters (which would reverse reversible clusters 134 and 130); or all clusters could be reversed; etc.

Further, with processing herein, the clusters can be ranked based on balancing the density of polygons within each mask; where, for example, cluster color reversals that tend to make opposing masks more balanced are ranked higher than cluster color reversals that tend to make opposing masks more unbalanced (with a highest ranking cluster color reversal being one that moves polygons to cause 50% of the polygons to be in one mask, and 50% of the polygons to be in the other mask (in a two complementary mask system)).

Figure 9A:
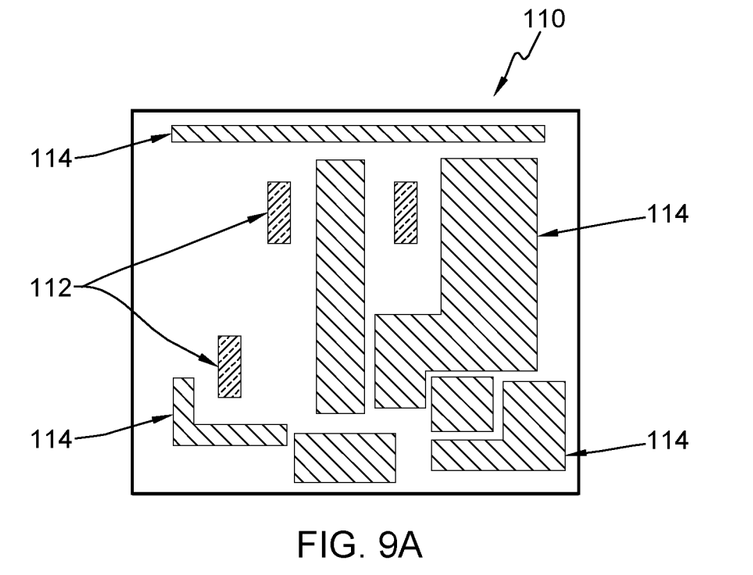
Figure 9B:
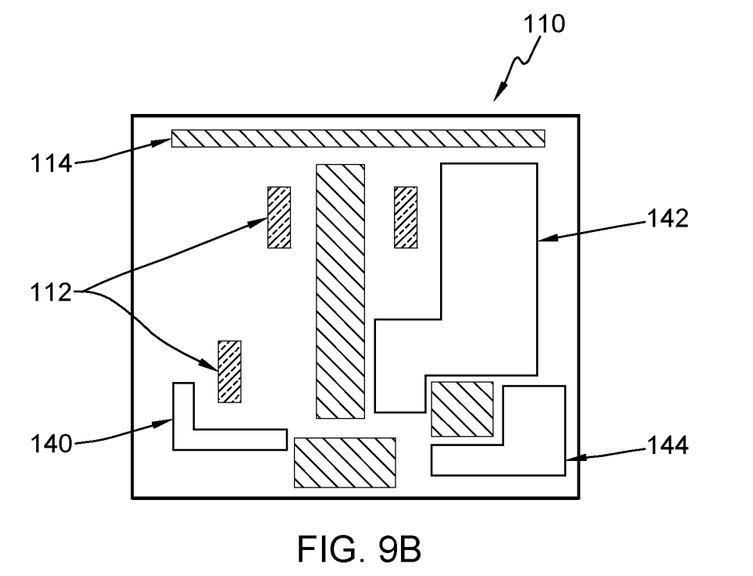

This is shown in FIGS. 9A-9B. More specifically, FIG. 9A again illustrates features of two masks 112, 114, combined on a representation 110, where the polygons are all shown as rectangles. As shown in FIG. 9A, the majority of the mask features are 114, with only a few mask features 112, causing representation 110 in FIG. 9A to be unbalanced with extra area consumed by mask features 114. FIG. 9B shows that the processing herein identifies three different reversible clusters of such rectangles 140, 142, and 144, which can all be reversed from mask feature 114 to mask feature 112.

As shown in FIG. 9B, reversible cluster 140 has the smallest area, reversible cluster 142 has the largest area, and reversible cluster 144 has an area sized between the other two. This situation causes processing herein to rank reversible cluster 142 first, reversible cluster 144 second, and reversible cluster 140 last, using mask balancing as the ranking metric, because such reversals are ranked from the one that causes the most balancing to the one that causes the least balancing. In other situations, for a mask that is only slightly unbalanced, and only needs a small reversal, the smallest reversible cluster 140 may be ranked highest (because it moves the representation 110 most toward balancing).

Here, depending upon the magnitude of the unbalanced nature of the masks; some, or all, of the reversible clusters could be switched to a different mask or mask phase. Further, after one of the reversible clusters is reversed, the remaining clusters can be re-ranked to allow successive ranking processes to approach the desired 50/50 balancing. Also, this metric can be combined with other metrics, where the reversible clusters (as ranked by other metrics) are performed only until the representation 110 contains balanced masks.

Figure 10A:
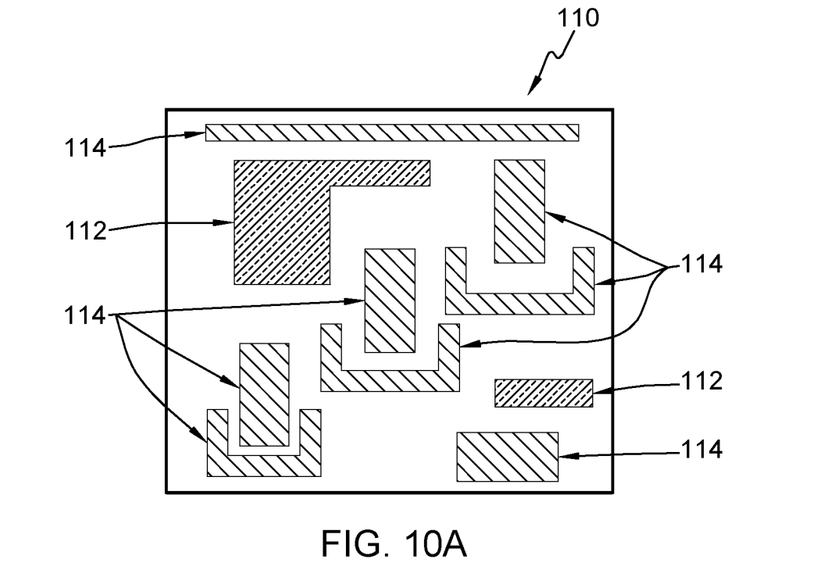
Figure 10B:
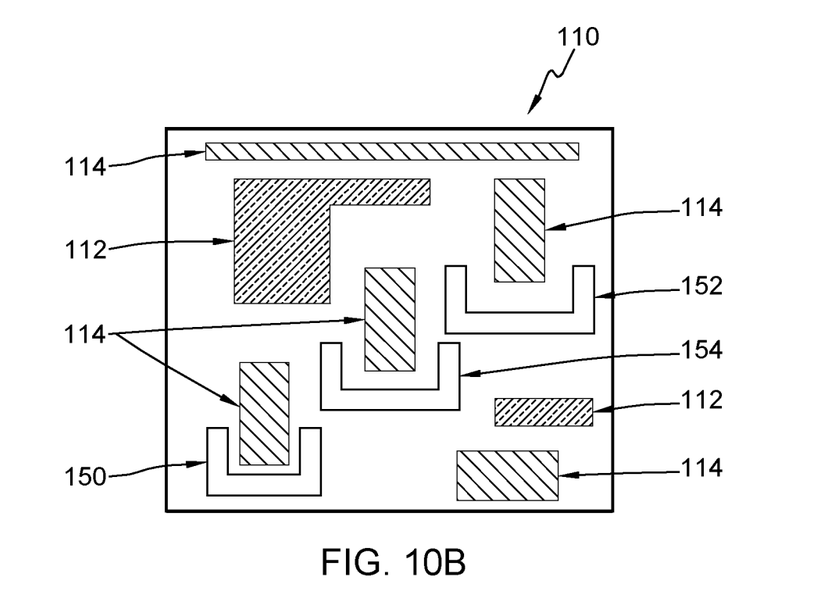

Post-move spacing can also be used to rank various potential cluster reversals, where cluster reversals that produce greater spacing between shapes on a given mask will be ranked higher relative to cluster reversals that produce less spacing between shapes, and this is shown in FIGS. 10A-10B. More specifically, FIG. 10A again illustrates features of two masks 112, 114, combined on a representation 110, where the polygons are all shown as rectangles. FIG. 10B shows that the processing herein identifies three different reversible clusters of such rectangles 150, 152, and 154, which can all be reversed from mask feature 114 to mask feature 112.

As shown in FIG. 10B, reversible cluster 150 has the smallest spacing relative to its closest adjacent polygon (and reversing cluster 150 eliminates the smallest spacing, producing the most benefit, and allowing it to be ranked first); reversible cluster 152 has the largest spacing relative to its closest adjacent polygon (and reversing cluster 152 only eliminates the largest spacing, but allows more closely spaced features 150 and 154 to remain, producing the least benefit and causing cluster 152 to be ranked last) and reversible cluster 154 has spacing relative to its closest adjacent polygon that is between the other two (causing it to be ranked second, in this example).

Similar to the previous examples, depending upon other possible metrics or preferences, some processing may only change the mask of one cluster, which would reverse only reversible cluster 150. As discussed above, mask balancing may alternatively allow the change of two clusters (which would only reverse clusters 150 and 154); or may allow the change of all three reversible clusters, etc.

Figure 11:
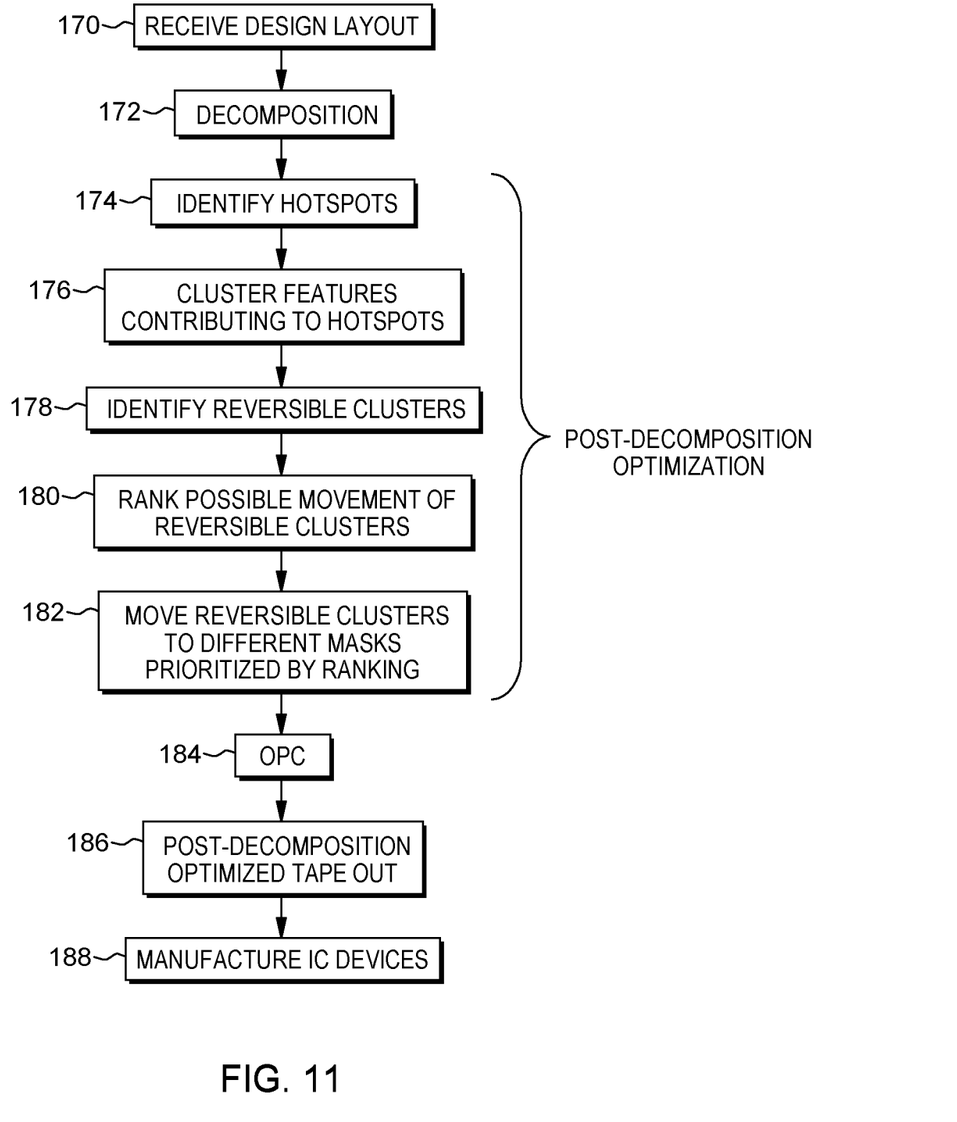
FIG. 11 is a flow diagram illustrating embodiments herein.

Various methods herein are illustrated in flowchart form in FIG. 11, and begin with a manually or automatically created integrated circuit (IC) design layout that is received into an automated decomposition application operating on a computerized system in item 170. The automated decomposition application automatically performs a decomposition of each layer in the multi-layer IC design layout into multiple masks or mask phases, in item 172, to produce an initial output.

Before OPC, an automated post-decomposition optimization application, also operating on the computer system, is used to automatically perform a post-decomposition optimization (shown in items 174-182) to revise the initial output, and thereby produce a post-decomposition optimized tape-out. The post-decomposition optimization involves a number of processes. One of these processes is shown in item 174 and can identify spacing rule violations by identifying violation areas (e.g., between polygon shapes) in the multiple masks that violate spacing rules, and therefore lack sufficient spacing for defect-free manufacturing. Also, the processing in item 174 can match shapes in the masks to known weak shapes (e.g., shapes that have been previously determined to present an elevated risk of manufacturing defects). These processes in item 174 identify what is referred to as "hotspots" in the multiple masks. More specifically, such hotspots occur where the spacing between adjacent features within one of the masks is below a previously established minimum spacing measure at which defect-free manufacturing can reliably be performed.

Another process performed during the post-decomposition optimization is clustering the IC design layout features that contribute to the hotspots into clusters, as shown in item 176. More specifically, the clustering performed in item 176 combines chains of connected and adjacent features that lack spacing for defect-free manufacturing. Thus, each of the clusters can have one or more polygon shapes within a single mask of the multiple masks (or mask phases).

The post-decomposition optimization also identifies which of the clusters can be relocated to a different mask to eliminate the hotspot, without violating design rules, in item 178, and these clusters are referred to as "reversible" features. Some decomposition applications produce two complementary masks for a given layer or level of the IC design, while other decomposition applications produce more masks per level. If only two complementary masks are produced, clusters in one mask are checked for compliance with the design rules to see if they can be moved to the other complementary mask. With more than two masks, the clusters can be checked for compliance with the design rules with possible movement to all the other masks.

An additional process performed during the post-decomposition optimization is ranking the possible movement of the reversible clusters to different masks in item 180 by comparing the reversible clusters, as potentially moved, to known manufacturability metrics. This ranking process 180 is based on, for example, which reversible clusters have fewer features, which reversible clusters provide more area balancing between the masks, and/or which reversible clusters provide more improvement in spacing between the features in the masks, etc. Then, in item 182, the post-decomposition optimization moves the reversible clusters to different masks according to the priority established by the ranking.

Additionally, with these methods an automated optical proximity correction (OPC) application, again operating on the computer system, is used to automatically perform an optical proximity correction process on the multiple masks, which generally enlarges some of the shapes in the masks, in item 184 to produce the post-decomposition optimized tape-out 186.

The decomposition of the IC design layout 172 is not repeated after, or during, the post-decomposition optimization (174-182). Later, these methods manufacture the IC devices in item 188 by applying the post-decomposition optimized tape-out 186 to manufacturing equipment, which is automatically controlled by the computerized system. The spacing rules, design rules, and manufacturability metrics are specific to a given foundry in which the IC devices are manufactured. Additionally, the multiple masks relate to the same area of the IC device that is manufactured, and are used at different points in a manufacturing process.

For purposes herein, a "semiconductor" is a material or structure that may include an implanted impurity that allows the material to sometimes be a conductor and sometimes be an insulator, based on electron and hole carrier concentration. As used herein, "implantation processes" can take any appropriate form (whether now known or developed in the future) and can comprise, for example, ion implantation, etc.

For purposes herein, an "insulator" is a relative term that means a material or structure that allows substantially less (<95%) electrical current to flow than does a "conductor." The dielectrics (insulators) mentioned herein can, for example, be grown from either a dry oxygen ambient or steam and then patterned. Alternatively, the dielectrics herein may be formed from any of the many candidate high dielectric constant (high-k) materials, including but not limited to silicon nitride, silicon oxynitride, a gate dielectric stack of $SiO_2$ and $Si_3N_4$, and metal oxides like tantalum oxide. The thickness of dielectrics herein may vary contingent upon the required device performance.

The conductors mentioned herein can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, any alloys of such metals, and may be deposited using physical vapor deposition, chemical vapor deposition, or any other technique known in the art.

While only one or a limited number of masks/shapes are illustrated in the drawings, those ordinarily skilled in the art would understand that many different types masks/shapes could be formed, and the drawings are intended to show formation of multiple different types of masks/shapes; however, the drawings have been simplified to only show a limited number of masks/shapes for clarity and to allow the reader to more easily recognize the different features illustrated.

Figure 12:
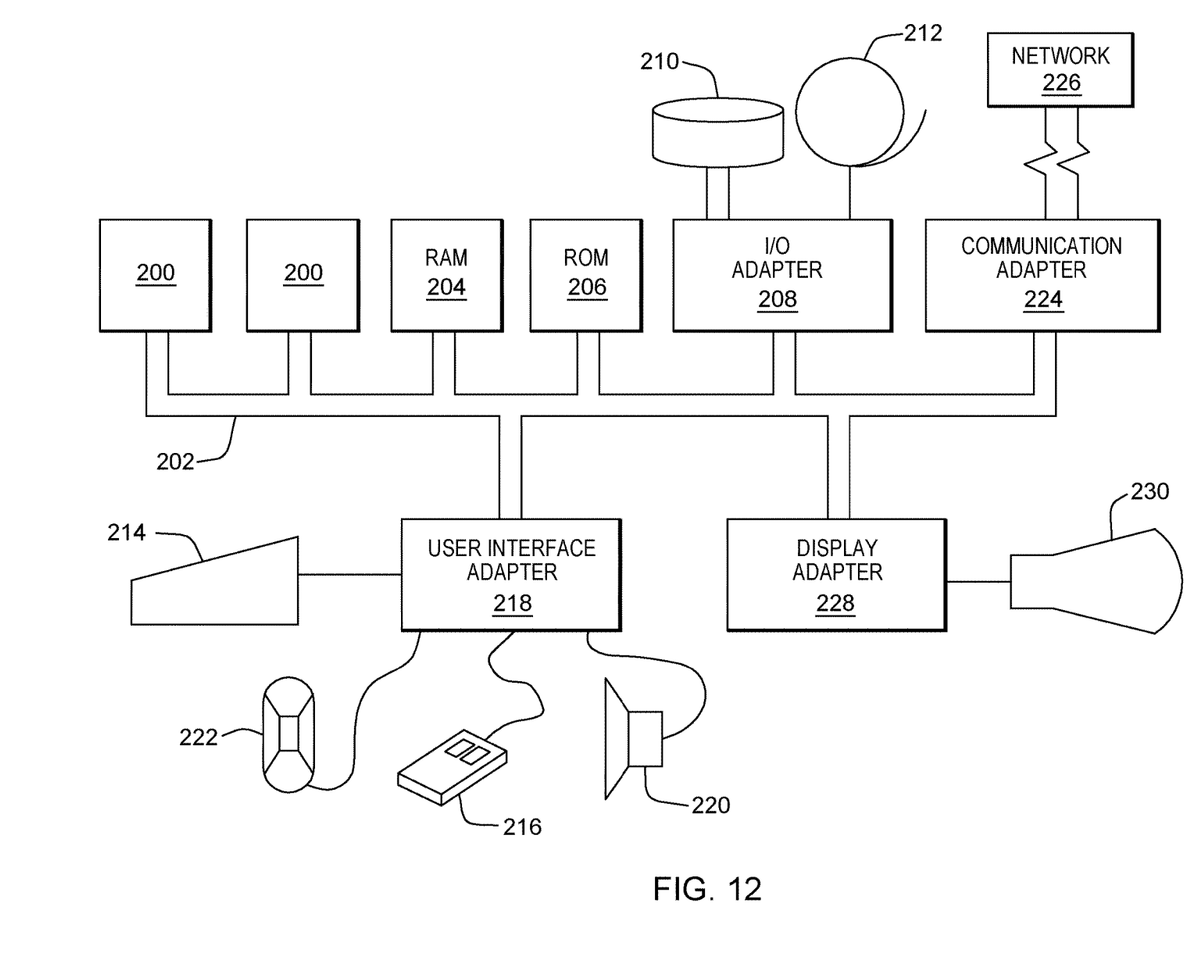
FIGS. 12 and 13 are schematic diagrams of hardware systems according to embodiments herein.

A representative hardware environment (i.e., a computer system) for implementing the systems, methods and computer program products disclosed above is depicted in FIG. 12. This schematic drawing illustrates a hardware configuration of an information handling/computer system in accordance with the embodiments herein. The system incorporates at least one processor or central processing unit (CPU) 200. The CPUs 200 are interconnected via a system bus 202 to various devices such as a random access memory (RAM) 204, read-only memory (ROM) 206, and an input/output (I/O) adapter 208. The I/O adapter 208 can connect to peripheral devices, such as disk units 210 and tape drives 212, or other program storage devices that are readable by the system. The system can read the inventive instructions on the program storage devices and follow these instructions to execute the methodology of the embodiments herein. The system further includes a user interface adapter 218 that connects a keyboard 214, mouse 216, speaker 220, microphone 222, and/or other user interface devices such as a touch screen device (not shown) to the bus 202 to gather user input. Additionally, a communication adapter 224 connects the bus 202 to a data processing network 226, and a display adapter 228 connects the bus 202 to a display device 230 which may be embodied as an output device such as a monitor, printer, or transmitter, for example.

Figure 13:
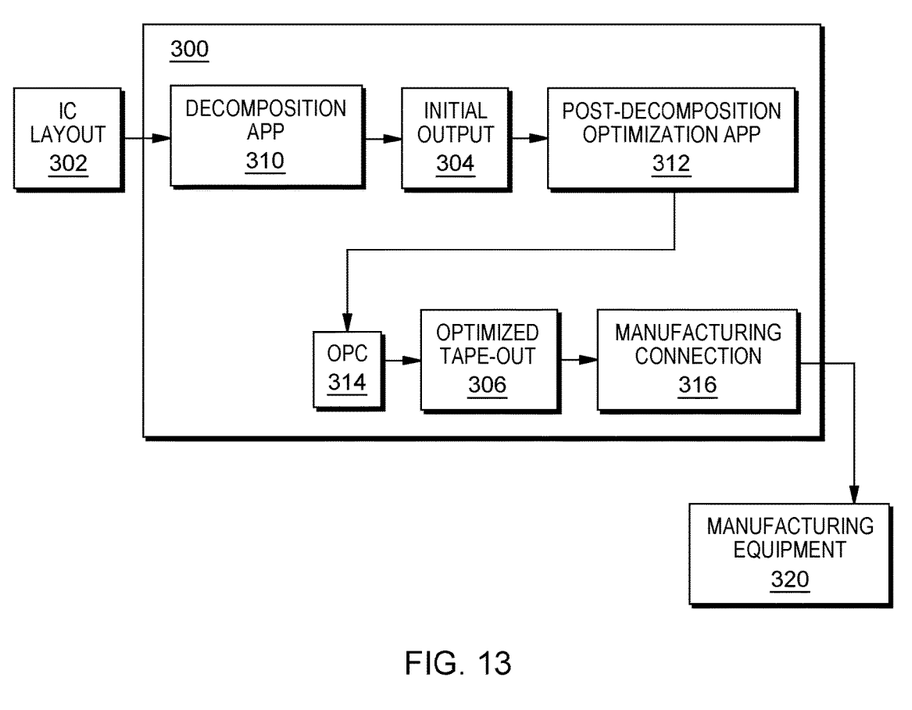

FIG. 13 illustrates an example of systems herein that include an automated decomposition application 310 operating on a computerized device 300. The automated decomposition application 310 is capable of receiving an integrated circuit (IC) design layout 302. The automated decomposition application 300 is capable of performing a decomposition of the IC design layout 302 into multiple masks to produce an initial output 304. The systems herein can also include an automated optical proximity correction (OPC) application 314 operating on the computerized device 300 that is capable of performing an optical proximity correction process on the multiple masks in the initial output 304 after an automated post-decomposition optimization application 312 performs a post-decomposition optimization. More specifically, the automated post-decomposition optimization application 314 operates on the computerized device 300, and is capable of performing a post-decomposition optimization.

The post-decomposition optimization identifies violation areas in the multiple masks that lack spacing for defect-free manufacturing, or matches shapes in the multiple masks to known weak shapes, to identify hotspots in the multiple masks. The post-decomposition optimization also clusters features that contribute to the hotspots into clusters, identifies ones of the clusters that can be relocated to a different mask to eliminate the hotspot, without violating design rules, as reversible clusters. Further, the post-decomposition optimization ranks movement of the reversible clusters by comparing the reversible clusters, as potentially moved, to known manufacturability metrics, and moves the reversible clusters to different masks according to the priority established by the ranking, to produce a post-decomposition optimized tape-out 306. This ranking process is based on, for example, which reversible clusters have fewer features, which reversible clusters provide more area balancing between the masks, and/or which reversible clusters provide more improvement in spacing between the features in the masks, etc.

These systems also include a connection 316 to manufacturing equipment 320 that is automatically controlled to be capable of manufacturing IC devices by applying the post-decomposition optimized tape-out 306 to the manufacturing equipment 320.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the foregoing. As used herein, the singular forms "a," "an," and "the" are intended to include the plural forms as well, unless the context clearly indicates otherwise. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element.

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method described above. In other words, one or more computer hardware devices can be created that are configured to implement the method and processes described herein with reference to the figures and their corresponding descriptions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A method comprising:
   receiving an integrated circuit (IC) design layout;
   performing a decomposition of the IC design layout into multiple masks to produce an initial output;
   performing a post-decomposition optimization comprising:
   identifying hotspots in the multiple masks;
   clustering features that contribute to the hotspots into clusters;
   identifying ones of the clusters that can be relocated to a different mask to eliminate the hotspot, without violating design rules, as reversible clusters;
   ranking movement of the reversible clusters by comparing the reversible clusters, as potentially moved, to known manufacturability metrics; and
   moving the reversible clusters to different masks according to a priority established by the ranking, to produce a post-decomposition optimized tape-out; and
   manufacturing IC devices by applying the post-decomposition optimized tape-out to manufacturing equipment.

2. The method according to claim 1, the ranking is based on which reversible clusters have less features, which reversible clusters provide more area balancing between the masks, or which reversible clusters provide more improvement in spacing between the features in the masks.

3. The method according to claim 1, the clustering combines connected and adjacent features that lack spacing for defect-free manufacturing.

4. The method according to claim 1, further comprising automatically, using an automated optical proximity correction (OPC) application, performing an optical proximity correction process on the multiple masks in the initial output after performing the post-decomposition optimization.

5. The method according to claim 1, the decomposition of the IC design layout is not repeated after, or during, the post-decomposition optimization.

6. The method according to claim 1, the design rules and the known manufacturability metrics, are specific to a given foundry in which the IC devices are manufactured.

7. The method according to claim 1, the multiple masks relate to the same area of the IC device that is manufactured, and are used at different points in a manufacturing process.

8. A method comprising:
receiving an integrated circuit (IC) design layout into an automated decomposition application operating on a computerized system;
automatically, using the automated decomposition application, performing a decomposition of the IC design layout into multiple masks to produce an initial output;
automatically, using an automated post-decomposition optimization application operating on the computerized system, performing a post-decomposition optimization comprising:
identifying violation areas in the multiple masks that lack spacing for defect-free manufacturing and matching shapes in the multiple masks to known weak shapes, to identify hotspots in the multiple masks;
clustering features that contribute to the hotspots into clusters;
identifying ones of the clusters that can be relocated to a different mask to eliminate the hotspot, without violating design rules, as reversible clusters;
ranking movement of the reversible clusters by comparing the reversible clusters, as potentially moved, to known manufacturability metrics; and
moving the reversible clusters to different masks according to a priority established by the ranking, to produce a post-decomposition optimized tape-out; and
manufacturing IC devices by applying the post-decomposition optimized tape-out to manufacturing equipment that is automatically controlled by the computerized system.

9. The method according to claim 8, the ranking is based on which reversible clusters have less features, which reversible clusters provide more area balancing between the masks, or which reversible clusters provide more improvement in spacing between the features in the masks.

10. The method according to claim 8, the clustering combines connected and adjacent features that lack spacing for defect-free manufacturing.

11. The method according to claim 8, further comprising automatically, using an automated optical proximity correction (OPC) application operating on the computerized system, performing an optical proximity correction process on the multiple masks in the initial output after the automated post-decomposition optimization application performs the post-decomposition optimization.

12. The method according to claim 8, the decomposition of the IC design layout is not repeated after, or during, the post-decomposition optimization.

13. The method according to claim 8, the design rules and the known manufacturability metrics, are specific to a given foundry in which the IC devices are manufactured.

14. The method according to claim 8, the multiple masks relate to the same area of the IC device that is manufactured, and are used at different points in a manufacturing process.

15. A system comprising:
a computerized device;
an automated decomposition application operating on the computerized device, the automated decomposition application is capable of receiving an integrated circuit (IC) design layout, the automated decomposition application is capable of performing a decomposition of the IC design layout into multiple masks to produce an initial output;
an automated post-decomposition optimization application operating on the computerized device, the automated post-decomposition optimization application is capable of performing a post-decomposition optimization comprising:
identifying violation areas in the multiple masks that lack spacing for defect-free manufacturing and matching shapes in the multiple masks to known weak shapes, to identify hotspots in the multiple masks;
clustering features that contribute to the hotspots into clusters;
identifying ones of the clusters that can be relocated to a different mask to eliminate the hotspot, without violating design rules, as reversible clusters;
ranking movement of the reversible clusters by comparing the reversible clusters, as potentially moved, to known manufacturability metrics; and
moving the reversible clusters to different masks according to a priority established by the ranking, to produce a post-decomposition optimized tape-out; and
a connection to manufacturing equipment that is automatically controlled to be capable of manufacturing IC devices by applying the post-decomposition optimized tape-out to the manufacturing equipment.

16. The system according to claim 15, the ranking is based on which reversible clusters have less features, which reversible clusters provide more area balancing between the masks, or which reversible clusters provide more improvement in spacing between the features in the masks.

17. The system according to claim 15, the clustering combines connected and adjacent features that lack spacing for defect-free manufacturing.

18. The system according to claim 15, further comprising an automated optical proximity correction (OPC) application capable of performing an optical proximity correction process on the multiple masks in the initial output after the automated post-decomposition optimization application performs the post-decomposition optimization.

19. The system according to claim 15, the decomposition of the IC design layout is not repeated after, or during, the post-decomposition optimization.

20. The system according to claim 15, the design rules and the known manufacturability metrics, are specific to a given foundry in which the IC devices are manufactured.

* * * * *